United States Patent [19]

Yoshino et al.

[11] Patent Number: 5,021,897

[45] Date of Patent: Jun. 4, 1991

[54] MEMORY SYSTEM FOR RECORDING AND REPRODUCING BLOCK UNIT DATA

[75] Inventors: Tadashi Yoshino, Neyagawa; Susumu Yamaguchi, Moriguchi; Hitoshi Komae, Osaka; Tetsuo Ishiwata, Suita; Eiji Yamauchi, Neyagawa; Hiroshi Tanaka, Moriguchi, all of Japan

[73] Assignee: Matsushita Electric Industrial Co., Ltd., Osaka, Japan

[21] Appl. No.: 203,107

[22] Filed: Jun. 7, 1988

[30] Foreign Application Priority Data

Jun. 12, 1987 [JP] Japan .................................. 62-147586
Aug. 28, 1987 [JP] Japan .................................. 62-215806
Oct. 6, 1987 [JP] Japan .................................. 62-252127

[51] Int. Cl.⁵ ............................................ G11B 27/10
[52] U.S. Cl. ................................................. 360/72.2
[58] Field of Search ...................... 360/19.1, 49, 72.2

[56] References Cited

U.S. PATENT DOCUMENTS 4,622,600  11/1986  Okamoto et al. ................. 360/49 X

FOREIGN PATENT DOCUMENTS

0164891  12/1985  European Pat. Off.
0222386   5/1987  European Pat. Off.
3151251   7/1983  Fed. Rep. of Germany.
3539182   5/1986  Fed. Rep. of Germany.
58-194183 11/1983  Japan .................................. 360/49
60-137150  7/1985  Japan.
61-292268 12/1986  Japan .................................. 360/49
62-223857  1/1987  Japan.
2145304    3/1985  United Kingdom.

Primary Examiner—Donald McElheny, Jr.
Attorney, Agent, or Firm—Stevens, Davis, Miller & Mosher

[57] ABSTRACT

There is provided a signal processing system for recording and reproducing a video signal and a digital audio signal with a rotary-head VTR and, more particularly, a memory control system which generates a block address and a memory write signal so that the sync signal for reproduced digital data is detected reliably and the digital data is stored in the memory circuit correctly.

1 Claim, 5 Drawing Sheets

MEMORY SYSTEM FOR RECORDING AND REPRODUCING BLOCK UNIT DATA

BACKGROUND OF THE INVENTION

1. Field of the Invention

This invention relates to a synchronization detection system, a block address generation system and a memory write signal generation system used for recording and reproducing serial digital data.

2. Description of the Prior Art

Figure 4:
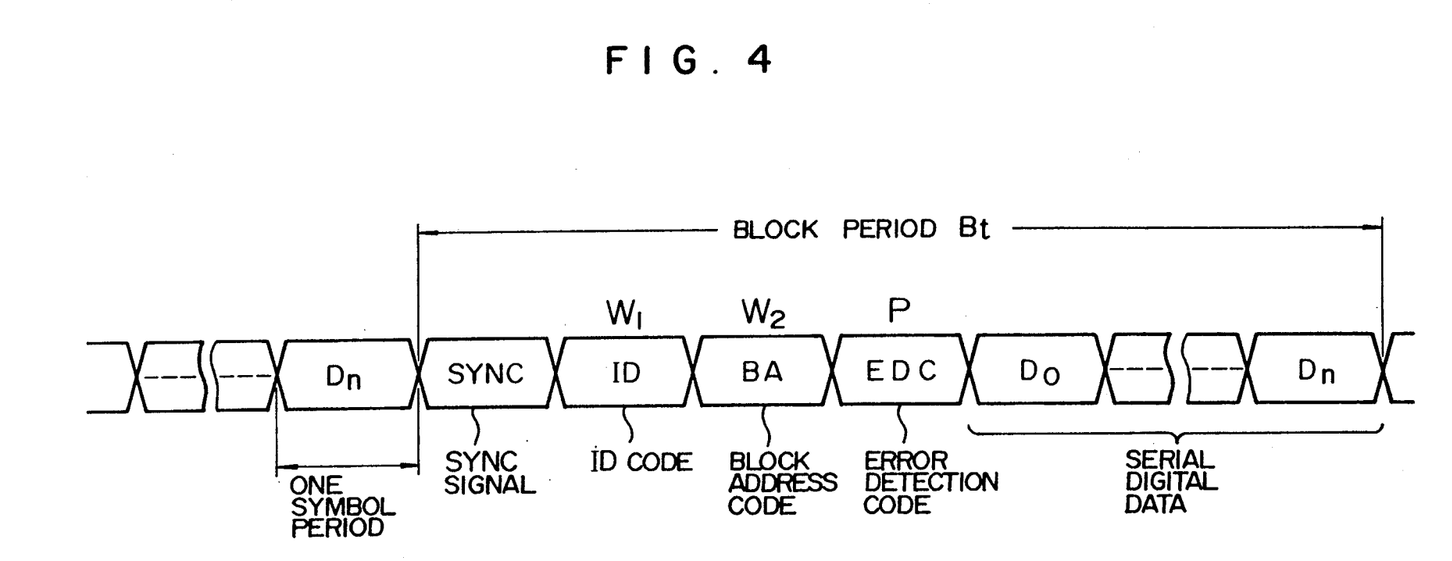
FIG. 4 is a signal structure diagram showing the format of serial digital data to be supplied to the input terminal 2 in FIG. 1.

Among the techniques of serial digital data recording and reproduction used in extensive fields, a recent application is a digital audio tape recorder (DAT). In a rotary-head digital audio tape recorder (R-DAT), for example, a recording signal is formatted in a constant block period Bt as shown in FIG. 4, in which serial digital data $D_0, D_1, \ldots, D_n$ are preceded by a synchronizing signal (SYNC) with a specific code pattern, a record identification code (ID), a block address code (BA), and an error detection code (EDC) for the ID and BA. Each code is formed of eight bits, and is called "symbol".

In the following description, the data of the identification code (ID) indicative of the content of recorded data, etc. is denoted by the symbol $W_1$, the data of the address code BA is denoted by the symbol $W_2$, and the data of the error detection code EDC is denoted by the symbol P.

The reproducing section has a sync generator providing the same code pattern as that of the recording section, and it compares the reproduced serial digital data with the sync pattern sequentially so as to decide a reproduced signal, when it coincides with the sync pattern, to be a sync signal so that it is used as a reference signal for the successive signal processing. This is the prevalent technique of serial digital data recording and reproduction.

The R-DAT employs a modulation system called "8-10 modulation" with its sync signal (SYNC) having a special pattern which does not appear in data normally, so that the accuracy of sync signal detection is appreciably high. However, in a case where a modulation system having a special sync pattern cannot be used by some reason, for example, because of the band limitation of the recording signals such as when recording both an analog video signal and a digital audio signal, it becomes inevitable to use a code pattern contained in data as a sync signal. In this case, false sync signals other than the valid sync signal will appear with high probability, and normal signal processing will be difficult. Although this problem may be solved by increasing the word length of the sync signal (SYNC), it will result disadvantageously in an increased recording frequency or a degraded signal transmission rate.

A conventional breakthrough technique for ensuring the sync signal detection without an increased word length of the sync signal is, in addition to the use of a first sync signal detection circuit, to detect predetermined regularity in the contents of two consecutive block address codes BA to utilize it as a second sync signal so that a final sync signal is obtained from a logical product of both the first and second sync signals, as disclosed, for example, in Japanese Patent Unexamined Publication No. 60-137150. The block address code BA generally uses a series of binary numbers increasing continuously from zero, and the detection of a predetermined difference in the value between two consecutive address codes ensures the sync signal detection.

However, since the above arrangement utilizes the regularity of two consecutive address codes, it fails to implement the ensured and prompt sync signal detection in such a case where one address code is dropped for example, at the time immediately after the start or the recovery from a code error which has occurred in data reproduction, because it becomes difficult to detect any regularity present in address data values in such a case.

Figure 5:
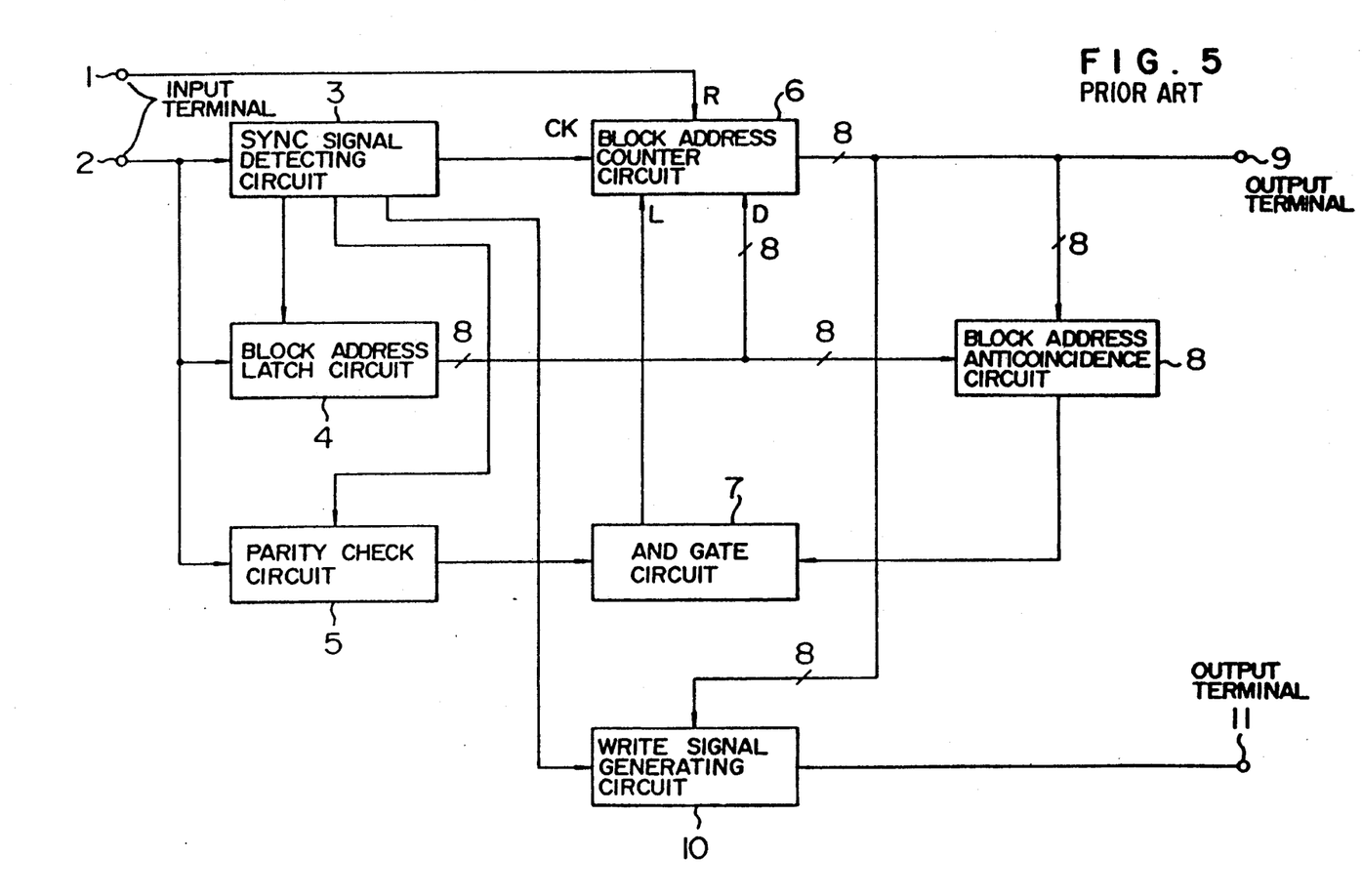
FIG. 5 is a block diagram showing a conventional memory control system.

FIG. 5 is a block diagram showing a conventional memory control apparatus. In the reproducing operation, serial digital data is inputted through an input terminal 2, and a sync signal detecting circuit 3 detects the sync signal and produces signals which are in phase with the sync signal. The serial digital data is also applied to a block address latch circuit 4, in which the address code BA is latched in response to a latch pulse supplied from the sync signal detecting circuit 3. The serial digital data is further fed to a parity check circuit 5, in which a positive parity check or a negative parity check is made in accordance with the following equation for the code structure shown in FIG. 4, for example.

$$P = W_1 \oplus W_2 \text{ or } P = \overline{W_1 \oplus W_2}$$

where symbol $\oplus$ represents an exclusive-OR operation.

Figure 1:
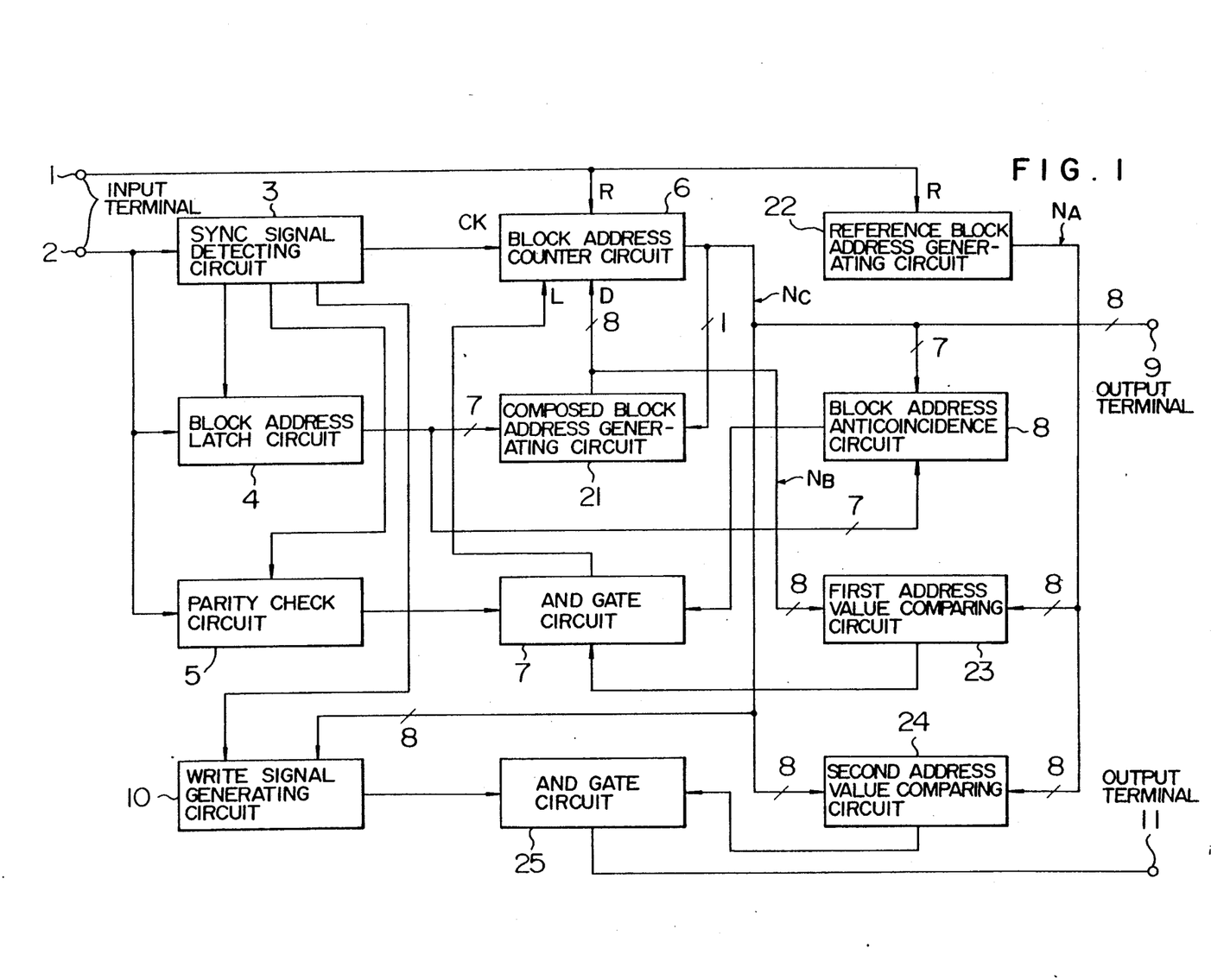
FIG. 1 is a block diagram showing the memory control system of this invention.

The sync signal detecting circuit 3 applies one output thereof to a clock terminal of a block address counter circuit 6, which further receives at its reset terminal rotary head switching pulses (the signal $S_1$ shown in FIG. 2) indicative of the rotational position of the rotary head (not shown) which are supplied through an input terminal 1. The block address counter circuit 6 has its contents cleared at the edge of a head switching pulse and counts the sync signal until it is cleared by a next head switching pulse. This operation is repeated. In FIGS. 1 and 5, numerals indicative of respective short slanting lines crossing the connection lines show bit numbers of digital signals sent through the connection lines, respectively. The block address counter circuit 6 and the block address latch circuit 4 apply their outputs (8 bits) to a block address anticoincidence circuit 8, which decides whether both block address values coincide with each other. The outputs of the block address anticoincidence circuit 8 and the parity check circuit 5 are applied to an AND gate 7, which outputs a pulse when the parity check result is correct and at the same time the block address values do not coincide with each other, and the output pulse is applied to the load terminal L of the block address counter circuit 6, and the 8-bit output of the block address latch circuit 4 is applied to the data terminal D of the block address counter circuit 6 so that the address value of the block address latch circuit 4 is loaded in the block address counter circuit 6. The block address counter circuit 6 produces an 8-bit output, which is outputted through an output terminal 9, and it forms a part of an address signal value for storing the reproduced digital data in a RAM (Random Access Memory).

Furthermore, the sync signal detecting circuit 3 and the block address counter circuit 6 supply their outputs to a write signal generating circuit 10, which provides an output through an output terminal 11, and it is used as a write signal for storing the reproduced digital data in the RAM.

Hereupon, in a magnetic recording and reproducing apparatus for recording and reproducing a video signal on a magnetic tape by using a rotary head, when recording and reproducing an audio signal in the form of a digital signal, an analog audio signal is digitized at a sampling frequency $f_s$ of 48 kHz, for example, so that a frequency ratio of the sampling frequency $f_s$ of 48 KHz to the field frequency $f_v$ of the video of 59.94 Hz in the NTSC system becomes 800.8. The number of data in one field is divided into two kinds, that is, a greater number and a smaller number (e.g., 792 and 810), and supplementary dummy data is added to the field containing a small number of data (792 data in one field) to effect recording. Since the MSB of the address code BA in FIG. 4 is used to record the information indicative of the presence or absence of the supplementary dummy data, the block address value is recorded in 7 bits. For example, when the number of blocks in one field is 135, the lower-order 7 bits of the block address code $W_2$ include the o-address (0000000) to 127-address (1111111). Then, the next 128-address is indicated by (0000000), and the last 134-address is indicated by 6(=134−128)-address (0000110). The block addresses are recorded in a magnetic tape with these bit indications.

However, in digitally recording an audio signal in synchronism with a video signal as mentioned above, the 8-bit block address value for the reproduction cannot be produced directly from the recording block address value, since the recording block address is recorded in 7 bits on the magnetic tape.

SUMMARY OF THE INVENTION

An object of this invention is to provide, in the case of recording and reproducing a digitized audio signal along with a video signal, a memory control system comprising a sync signal detecting circuit, a block address generating circuit and a write signal generating circuit for storing the digital data in the RAM.

In order to attain the above object, the memory control system of this invention utilizes a first sync signal, which is detected by making a comparison of coincidence of a reproduced sync signal with a sync signal pattern, and an error detection signal, which is produced by conducting a predetermined computation on an auxiliary code, an address code and an error detection code which are added along with a sync signal, so that the first sync signal is passed to be used as a second sync signal only when the error detection signal indicates the absence of error. In order to implement the present invention, the memory control system comprises a block address predicting means which predicts an address recorded at a reproducing position in accordance with the rotational position of a rotary head, a composed address generating means which produces a composed address value from a reproduced address value read out from a magnetic tape by the rotary head and an output address value, a first address value comparing means which compares the composed address value with the predicted address value provided by the block address predicting means, an address selecting means which selects the composed address value as a new output address value only when a comparison error provided by the first address value comparing means is within a predetermined range, a second address value comparing means which compares the output address value from the address selecting means with the predicted address, and a write signal generating means which produces a write signal for storing in a memory the reproduced digital data reproduced from the magnetic tape only when a comparison error provided by the second address value comparing means is within a predetermined range.

In the above-described structure the error detection code, etc. are utilized as a kind of a sync signal in addition to a first sync signal detected by making a comparison of coincidence of the reproduced sync signal with the sync pattern, and a logical-OR operation on both signals are conducted to elevate the precision of the sync signal detection. A result of the error detection of the additional codes, when a sync signal is dropped, has low validity, and when a word length of the whole error detection code system is relatively short, the influence of a code error is small and it can be of sufficient use as a reference signal for distinguishing pseudo or false sync signals. As a result, an equivalent advantage of a substantially increased word length of a sync signal can be obtained, so that the sync signal detection with high precision, which is completed in a block, is accomplished without using the regularity between a plurality of blocks.

In the reproduction from a magnetic tape on which a digital signal having a sync signal and an address added thereto is recorded with a rotary head so that the sync signal and the address are located at a predetermined position on the track, the rotational position of the reproducing rotary head is detected to predict the recorded address (8 bits), a composed address value (8 bits) is produced from the reproduced address value (7 bits) and the output address value (the most significant 1 bit among the 8 bits), the composed address value (8 bits) is compared with the predicted address value (8 bits), and the composed address value is adopted as a new address value when a comparison error is within a predetermined range, whereby a correct address value is produced. In addition, the output address value is compared with the predicted address value, and a write signal for storing the reproduced digital data in the RAM is generated only when a comparison error is within a predetermined range, whereby the digital data can be written only at a location close to a correct address. As described above, a most significant bit of the block address value is obtained while limiting a range of the block address value by using an address value predicted from the rotational position of the rotary head, whereby the reproduced digital data can be stored in the RAM with a correct block address value. Further, in the case of a failure of parity check whereby a correction of the block address value has been made erroneously, the write signal is generated in a region in the block address value range which has been limited by the predicted address value, and the range of RAM area, in which the reproduced digital data is stored, is confined to be close to the predicted address value. As a result, even if a complete track of reproduced digital data is not stored in the RAM, it is possible to initiate an error correction process for the reproduced digital data stored in the RAM, so that it is made possible to make a significant reduction in time after the reproduced digital data has been stored in the RAM and before the error correction process is started. Therefore, a data processing time at the time of reproducing a digitally recorded audio signal is reduced significantly, and hence a processing delay time difference ($T_D$) of an audio signal from a video signal at the time of recording and reproducing both signals can be minimized. Especially, even when the number of times (n) of dubbing is increased, since the processing delay time difference in this case ($T_{Dn} = T_D \times n$) of an audio signal from a video signal is still small, a magnetic recording and reproducing apparatus having a unnoticeable processing delay time difference can be realized.

DESCRIPTION OF THE PREFERRED EMBODIMENTS

Figure 2:
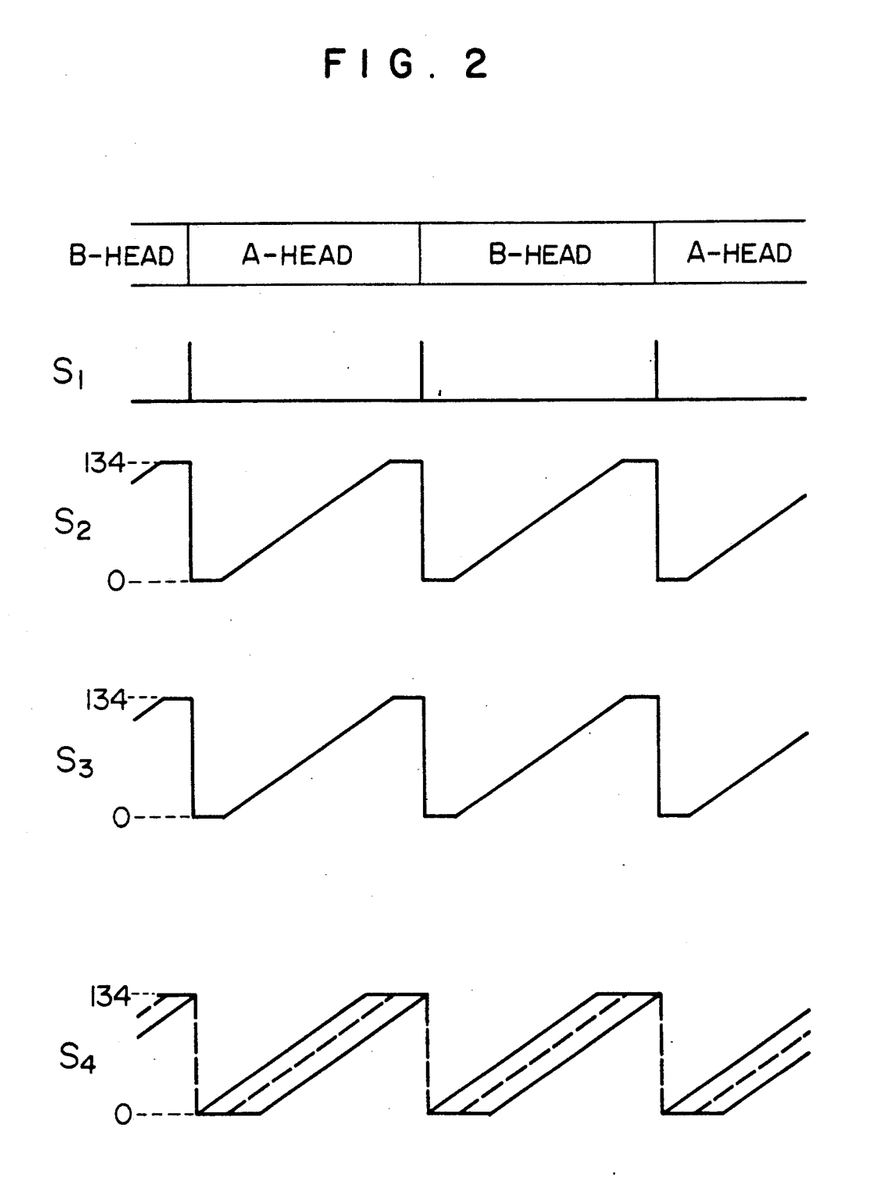
FIG. 2 is a waveform diagram showing the main signal waveforms in the memory control system shown in FIG. 1.

FIG. 1 is a block diagram showing the memory control system embodying the present invention, and FIG. 2 is a waveform diagram showing the signals appearing at various portions in FIG. 1. In the reproducing operation, an input terminal 2 in FIG. 1 receives serial digital data, and a sync signal detecting circuit 3 detects the sync signal and produces a signal which are in phase with the sync signal. A block address latch circuit 4 extracts and latches an address code BA in the serial digital data in response to the latch pulse supplied from the sync signal detecting circuit 3. A parity check circuit 5 implements an even-parity test or an odd-parity test for the serial digital data in accordance with the following equation for the code structure shown in FIG. 4, for example, in response to a pulse supplied from the sync signal detecting circuit 3.

$$p = W_1 \oplus W_2 \text{ or } \overline{W_1 \oplus W_2}$$

where $\oplus$ symbol denotes an exclusive-OR operation.

The output of the sync signal detecting circuit 3 is applied to a clock input terminal of a block address counter circuit 6, and a head switching pulse signal (shown by $S_1$ in FIG. 2) indicative of a rotational position of the rotary head (not shown) is supplied through an input terminal 1 and is applied to a reset terminal of the block address counter circuit 6. The count value of the block address counter circuit 6 is shown by signal $S_2$ in FIG. 2. The block address counter circuit 6 is reset by the head switching pulse, and then it restarts to count up the sync signal using it as a clock signal until it reaches the maximum block address value (134) and stops there. Then, the counter is reset by a next head switching pulse signal, and these operations are repeated. The block address counter circuit 6 and the block address latch circuit 4 apply their lower-order 7-bit outputs to a block address anticoincidence circuit 8, which tests whether both block address values are equal to each other. The lower-order 7-bit output from the block address latch circuit 4 and the most significant 1-bit output from the block address counter 6 are applied to a composed block address generating circuit 21, which produces a composed block address value, with the most significant bit being supplied from the output of the block address counter circuit 6 and with the lower-order 7 bits being supplied from the output of the block address latch circuit 4. A reference block address generating circuit or a predicted address generating circuit 22, which is formed of a counter circuit, receives at its reset terminal a head switching pulse signal supplied from the input terminal 1, and it operates to count up an internal reference clock. The content of the counter is shown analogously by signal $S_3$ in FIG. 2. The circuit 22 is reset by the head switching pulse signal, and then it restarts to count up the internal reference clock until it reaches the maximum block address value (134) and stops there. These operations are repeated, and block address values corresponding to the head position are generated. The reference block address generating circuit 22 and the composed block address generating circuit 21 apply their 8-bit outputs to a first address value comparing circuit 23. The first address value comparing circuit 23 conducts the following computation of an absolute value.

$$N_1 = |N_A - N_B|$$

where $N_A$ denotes a predicted address value provided by the reference block address generating circuit 22 and $N_B$ denotes a composed address value provided by the composed block address generating circuit 21. The circuit 23 further compares the computation result $N_1$ with a predetermined value $N_{1REF}$.

The parity check circuit 5, the block address anticoincidence circuit 8 and the first address value comparing circuit 23 apply their outputs to an AND gate circuit 7, which produces an output pulse on condition that the parity test result is correct, the block address values do not coincide with each other, and besides the following condition is met.

$$N_{1REF} > |N_1 - N_B|$$

(The signal $S_4$ in FIG. 2 shows a range which satisfies this condition. The broken line shows the signal $S_3$, and the parallelogram shown by the solid line and including the broken line as its center line represents the above-mentioned range.) The output pulse of the AND gate circuit 7 is applied to a load terminal L of the block address counter circuit 6. The composed block address generating circuit 21 has its 8-bit output applied to a data input terminal D and loaded in the block address counter circuit 6 in response to the load pulse supplied from the AND gate circuit 7. The 8-bit output of the block address counter circuit 6 is sent out through an output terminal 9 to form a part of an address value for storing the reproduced digital data in the RAM.

The sync signal detecting circuit 3 and the block address counter circuit 6 apply their outputs to a write signal generating circuit 10, and the block address counter circuit 6 and the reference block address generating circuit 22 apply their 8-bit outputs to a second address value comparing circuit 24. The second address value comparing circuit 24 conducts the following computation of an absolute value.

$$N_2 = |N_A - N_C|$$

where $N_A$ denotes a predicted address value provided by the reference block address generating circuit 22, and $N_C$ denotes an output address value from the block address counter circuit 6. Further, the second address value comparing circuit 24 compares the computation result $N_2$ with a predetermined value $N_{2REF}$. Next, the write signal generating circuit 10 and the second address value comparing circuit 24 apply their outputs to an AND gate circuit 25, which produces a write signal when the following condition is met.

$$N_{2REF} > |N_A - N_C|$$

(This condition is represented by the internal area of the parallelogram of the signal $S_4$ shown in FIG. 2 by the solid line and including the broken line as its center line.) The write signal is sent out through an output terminal 11, and it is used as a write signal for storing the reproduced digital data in the RAM.

Figure 3:
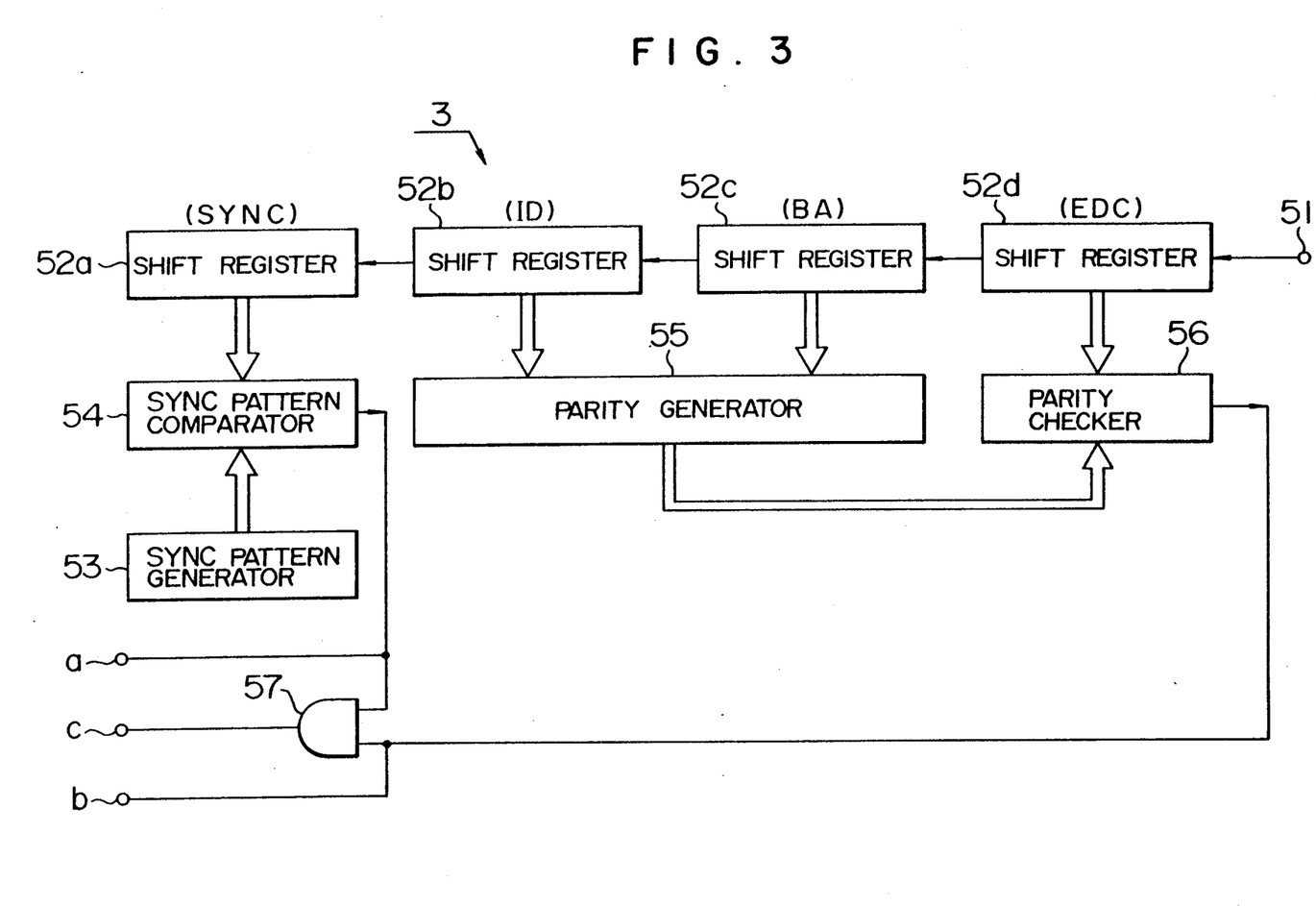
FIG. 3 is a block diagram showing the structure of the apparatus for implementing the sync signal detecting circuit 3 shown in FIG. 1.

FIG. 3 shows a specific circuit arrangement of the sync signal detecting circuit 3 in FIG. 1. In the figure, indicated by 51 is an input terminal for receiving serial digital data at the time of reproduction, 52a-52d are shift registers for effecting serial-to-parallel conversion, 53 is a sync pattern generator which is arranged beforehand in the reproducing section and which is identical with that in the recording section, 54 is a sync pattern comparator which makes a comparison of coincidence of the parallel digital data produced by the shift register 52a with pattern data generated by the sync pattern generator 53 and produces a first sync signal a upon detection of coincidence, 55 is a parity generator for generating an error detection code by performing a predetermined computation on the parallel digital data produced by the shift registers 52b and 52c, 56 is a parity checker, which makes a comparison of coincidence of the parity code produced in the reproducing section with the parity code added at the time of recording, and produces an error signal b upon detection of anticoincidence, and 57 is an AND gate circuit which produces a second sync signal c from the first sync signal a and error signal b.

The operation of an embodiment of the sync signal detecting circuit, which has been constructed as described above, will now be explained with reference to FIGS. 3 and 4. When the signal in the form such as shown in FIG. 4 is supplied to the serial digital data input terminal 51, the shift register 52a, the sync pattern generator 53 and the sync pattern comparator 54 cooperate to detect, from the serial digital data, the pattern signal which coincides with the sync signal, thereby to obtain a first sync signal. If a pattern length of the sync signal is sufficiently long, the sync signal can be detected with high precision, and, even when a sync signal is dropped, a missing sync signal can be restored by the interpolation utilizing the periodic property. On the other hand, however, if a sufficiently long pattern length cannot be utilized, pseudo or false sync signals are apt to be produced with very high probability, due to the data which is contained in the serial digital data and which has the same pattern as the sync signal, whereby accurate sync detection becomes difficult.

As a means of distinguishing false sync signals and preventing their generation, this embodiment of the present invention utilizes the regularity of the successive timing relation of the sync signal and the error detection signal within the same block.

That is, at the time when the first sync signal is detected, error detection for the auxiliary code, the address code and the error detection code arranged in succession to the sync signal is conducted by using the shift registers 52b, 52c and 52d, the parity generator 55, and the parity checker 56. The resulting error detection signal is deemed to be a kind of a sync signal, and a logical product of the resulting error detection signal and the first sync signal is obtained through the AND gate 57 to effect selection of false sync signals, thereby elevating the accuracy of sync signal detection. In the case of the signal structure shown in FIG. 4, each code other than the sync signal has 8 bits. The 8-bit error detection code has error detection probability of $2^{-8}$, which is mathematically proved to be equivalent in the capability to the 8-bit sync signal pattern. In addition to the original 8-bit sync signal pattern, 16-bit sync detection accuracy in total is attained by using the 8-bit sync signal pattern. The error detection code may be of any type, provided that it allows parallel processing. As a system of the simple structure and yet having high error detection capability, there is an even or odd parity test represented by the following equation in the code structure shown in FIG. 4.

$$P = W_1 \oplus W_2 \text{ or } P = \overline{W_1 \oplus W_2}$$

where symbol $\oplus$ denotes an exclusive-OR operation.

In the case where all data tends to become logically "low" when a code error has taken place, the odd parity test is effective for ensuring the error detection.

According to this embodiment of the present invention as described above, by assuming the result of error detection by using the auxiliary code, the address code and the error detection code to be equivalently an 8-bit sync signal to be added to the proper 8-bit sync signal, it becomes possible to realize the sync signal detection which is completed in one block and has substantial capability of 16-bit sync signal detection without increasing a length of the sync signal.

Although, in this embodiment, the error detection code, etc. have a 8-bit code length, any optional value may be used to meet the requirement of the system specifications.

Although an application of the sync signal detection system of this embodiment to the recording and reproducing system has been explained as an example, this invention is of course also effectively applicable to the other apparatuses such as the communication equipment etc., which perform transmission of a digital signal.

What is claimed is:

1. A signal processing system for controlling recording and reproduction of block unit data which is adapted to be recorded at a predetermined position on a track of a magnetic tape and which includes digital data representing an information signal, a synchronizing signal and an address code indicative of an address value of a block unit in which said digital data is contained, said signal processing system comprising: address predicting means for predicting said address code in accordance with a rotational position of a rotary head which reproduces data recorded on the magnetic tape; reading means for reading said address code; address generation means for generating said address value in accordance with said sync signal; composed address value generation means for generating a composed address value on the basis of an output of said reading means and an output of said address generation means; first address value comparison means for comparing said composed address value with said predicted address code value; selection means for outputting said composed address value as an address value for accessing a memory circuit when a comparison error of said first address value comparison means is within a predetermined range; second address value comparison means for comparing the address value outputted from said selection means with said predicted address code value; and writing signal generation means for generating a writing signal for storing said digital data in said memory circuit when a comparison error of said second address value comparison means is within a predetermined range.

* * * * *